(12) United States Patent
Somasundaran et al.

(10) Patent No.: US 10,380,490 B1
(45) Date of Patent: Aug. 13, 2019

(54) SYSTEMS AND METHODS FOR SCORING STORY NARRATIONS

(71) Applicant: Educational Testing Service, Princeton, NJ (US)

(72) Inventors: Swapna Somasundaran, Plainsboro, NJ (US); Chong Min Lee, Pennington, NJ (US); Martin Chodorow, New York, NY (US); Xinhao Wang, San Francisco, CA (US)

(73) Assignee: Educational Testing Service, Princeton, NJ (US)

( * ) Notice: Subject to any disclaimer, the term of this patent is extended or adjusted under 35 U.S.C. 154(b) by 840 days.

(21) Appl. No.: 15/055,417

(22) Filed: Feb. 26, 2016

Related U.S. Application Data

(60) Provisional application No. 62/121,085, filed on Feb. 26, 2015.

(51) Int. Cl.
  *G06F 15/18* (2006.01)
  *G06N 5/04* (2006.01)
  *G06N 20/00* (2019.01)

(52) U.S. Cl.
  CPC ............ *G06N 5/048* (2013.01); *G06N 20/00* (2019.01)

(58) Field of Classification Search
  CPC ............................. G06F 17/274; G06F 16/30
  USPC ...................................................... 706/15, 45
  See application file for complete search history.

(56) References Cited

U.S. PATENT DOCUMENTS 7,363,308 B2 * 4/2008 Dillon ................... G06F 16/30
                                                                707/706
9,836,985 B2 * 12/2017 Somasundaran ..... G06F 17/274

OTHER PUBLICATIONS

Attali, Yigal, Burstein, Jill; Automated Essay Scoring with E-Rater, v.2; Journal of Technology, Learning and Assessment, 4(3); 2006.
Beigman Klebanov, Beata, Burstein, Jill, Madnani, Nitin; Sentiment Profiles of Multiword Expressions in Test-Taker Essays: The Case of Noun-Noun Compounds; ACM Transactions on Speech and Language Processing (TSLP), 10(3); Jul. 2013.
Botvin, Gilbert, Sutton-Smith, Brian, The Development of Structural Complexity in Children's Fantasy Narratives; Developmental Psychology, 13(4); pp. 377-388; Jul. 1977.
Brants, Thorsten, Franz, Alex; Web 1T 5-gram Version 1; LDC2006T13, Linguistic Data Consortium; 2006.
Chodorow, Martin, Leacock, Claudia; An Unsupervised Method for Detecting Grammatical Errors; Proceedings of the 1st North American Chapter of the Association for Computational Linguistics Conference; pp. 140-147; 2000.
(Continued)

*Primary Examiner* — David R Vincent
(74) *Attorney, Agent, or Firm* — Jones Day

(57) ABSTRACT

Computer-based systems and methods are provided for generating a narrative computer scoring model for assessing story narratives. In one embodiment, supervised machine learning is used to generate the narrative computer scoring model. For example, a collection of training story narratives with assigned scores may be used to train the model. In one embodiment, each training story narrative is processed to extract features that signify content relevance, collocation of commonly used words, coherency, detailing, and expressions of sentiment. These features, as well as others, may be selectively used to train a narrative computer scoring model. Once trained, the model can be used to automatically evaluate story narratives and assign appropriate scores.

25 Claims, 11 Drawing Sheets

(56) References Cited

OTHER PUBLICATIONS

Cohen, Jacob; Weighted Kappa: Nominal Scale Agreement with Provision for Scaled Disagreement or Partial Credit; Psychological Bulletin, 70(4); pp. 213-220; Oct. 1968.
Ellis, Rod; Task-based Research and Language Pedagogy; Language Teaching Research, 4(3); pp. 193-220; 2000.
Evanini, Keelan, Wang, Xinhao; Automated Speech Scoring for Non-Native Middle School Students with Multiple Task Types; Proceedings of Annual Conference on International Speech Communication Association; pp. 2435-2439; Aug. 2013.
Evanini, Keelan, Heilman, Michael, Wang, Xinhao, Blanchard, Daniel; Automated Scoring for the TOEFL Junior Comprehensive Writing and Speaking Test; ETS Research Report, RR-15-09; pp. 1-11; Jun. 2015.
Feng, Yansong, LAPATA, Mirella; Topic Models for Image Annotation and Text Illustration; Proceedings of the Human Language Technologies: The 2010 Annual Conference of the North American Chapter of the ACL; pp. 831-839; Jun. 2010.
Forbes-McKay, K.E., Venneri, A.; Detecting Subtle Spontaneous Language Decline in Early Alzheimer's Disease with a Picture Description Task; Neurological Sciences, 26(4); pp. 243-254; Oct. 2005.
Hassanali, Khairun-nisa; Liu, Yang, Solorio, Thamar; Using Latent Dirichlet Allocation for Child Narrative Analysis; Proceedings of the Workshop on Biomedical Natural Language Processing; pp. 111-115; Aug. 2013.
King, Levi, Dickinson, Markus; Shallow Semantic Analysis of Interactive Learner Sentences; Proceedings of the 8th Workshop on Innovative Use of NLP for Building Educational Applications; pp. 11-21; Jun. 2013.
Kuznetsova, Polina, Ordonez, Vicente, Berg, Alexander, Berg, Tamara, Choi, Yejin; Collective Generation of Natural Image Descriptions; Proceedings of the 50th Annual Meeting of the Association for Computational Linguistics; pp. 359-368; 2012.
Leacock, Claudia, Chodorow, Martin, Gamon, Michael, Tetreault, Joel; Automated Grammatical Error Detection for Language Learners; Synthesis Lectures on Human Language Technologies; 2010.
Lee, Choonkyu, Muresan, Smaranda, Stromswold, Karin; Computational Analysis of Referring Expressions in Narratives of Picture Books; Workshop on Computational Linguistics for Literature; pp. 1-7; Jun. 2012.
Leong, Chee Wee; Mihalcea, Rada, Hassan, Samer; Text Mining for Automatic Image Tagging; Proceedings of the 23rd International Conference on Computational Linguistics: Poster Volume; pp. 647-655; Aug. 2010.
Li, Siming, Kulkarni, Girish, Berg, Tamara, Berg, Alexander, Choi, Yejin; Composing Simple Image Descriptions Using Web-scale N-grams; Proceedings of the 15th Conference on Computational Natural Language Learning; pp. 220-228; 2011.
Lin, Dekang; Automatic Retrieval and Clustering of Similar Words; Proceedings of the 17th International Conference on Computational Linguistics (COLING-98); pp. 768-773; 1998.
Manning, Christopher, Schutze, Hinrich; Foundations of Statistical Natural Language Processing; MIT Press: Cambridge, MA; 1999.
McKeough, Anne, Malcolm, Jennifer; Stories of Family, Stories of Self: Developmental Pathways to Interpretive Thought During Adolescence; New Directions for Child & Adolescent Development, 2011(131); pp. 59-71; Spring 2011.
Mitchell, Margaret, Dodge, Jesse, Goyal, Amit, Yamaguchi, Kota, Stratos, Karl, Han, Xufeng, Mensch, Alyssa, Berg, Alexander, Berg, Tamara, Daume, Hal; Midge: Generating Image Descriptions From Computer Vision Detections; Proceedings of the 13th Conference of the European Chapter of the Association for Computational Linguistics; pp. 747-756; 2012.
Prasad, Rashmi, Dinesh, Nikhil, Lee, Alan, Miltsakaki, Eleni, Robaldo, Livio, Joshi, Aravind, Webber, Bonnie; The Penn Discourse TreeBank 2.0; Proceedings of the LREC; 2008.
Somasundaran, Swapna, Chodorow, Martin; Automated Measures of Specific Vocabulary Knowledge from Constructed Responses ("Use These Words to Write a Sentence Based on this Picture"); Proceedings of 9th Workshop on Innovative Use of NLP for Building Educational Applications; pp. 1-11; Jun. 2014.
Sun, Lei, Nippold, Marilyn; Narrative Writing in Children and Adolescents: Examining the Literate Lexicon; Language, Speech, and Hearing Services in Schools, 43(1); pp. 2-13; Jan. 2012.
Wilson, Theresa, Wiebe, Janyce, Hoffmann, Paul; Recognizing Contextual Polarity in Phrase-Level Sentiment Analysis; Proceedings of the Human Language Technology Conference and Conference on Empirical Methods in Natural Language Processing (HLT-EMNLP); pp. 347-354; 2005.
Yao, Benjamin, Yang, Xiong, Lin, Liang, Lee, Mun Wai, Zhu, Song-Chun; I2T: Image Parsing to Text Description; Proceedings of the IEEE, 98(8); pp. 1485-1508; 2010.

\* cited by examiner

SYSTEMS AND METHODS FOR SCORING STORY NARRATIONS

CROSS-REFERENCE TO RELATED APPLICATIONS

The present application claims priority from U.S. Provisional Application Ser. No. 62/121,085 entitled "Automated Scoring of Picture-based Story Narration," filed Feb. 26, 2015, the entirety of which is hereby incorporated by reference.

FIELD

This disclosure is related generally to machine learning and artificial intelligence, and more particularly to machine assessment of story narration.

BACKGROUND

It can be desirable to use story-telling in assessing the development of language skills. For example, language skills may be tested by using prompts to elicit narrations of stories from test takers. As an example, a test taker whose language skills are being assessed may be presented with a picture-based story narration task, where a series of pictures (e.g., similar to a comic strip) is presented to the test taker. The test taker is expected to incorporate the events in the pictures into a narrated story. The test taker's story narration can be assessed and a score reflecting a perceived quality of the story narration can be assigned.

A challenge, however, is that assessment of story narrations can be resource intensive in terms of human labor, costs, and time.

SUMMARY

The present inventors have observed a need for machine-based computerized approaches to automatically assess and score story narrations without human judgment or intervention. In this regard machines operate and process information much differently than humans. A technical problem is faced in configuring and training a computer to discern good story narratives and provide an automated reliable assessment and score of such narratives. The disclosed embodiments described herein may address these and other technical problems. Systems and methods are described herein for enabling a computer to automatically assess a story narrative. Computers are instructed to identify various characteristics evidencing narrative quality, such as, e.g., relevancy and completeness of the narratives' content with respect to the prompts, as well as use of narrative techniques such as detailing to enhance the story, sequencing strategies for building a coherent story, among others.

In an exemplary embodiment, a processing system encoded with instructions for generating a narrative computer scoring model for assessing story narratives is provided. The processing system may be instructed to retrieve story narratives, wherein each story narrative is associated with a prompt that elicited the story narrative. In addition, the processing system may be instructed to retrieve reference corpora associated with the story narratives. Each story narrative's associated reference corpus includes content words relating to the associated prompt. For each of the retrieved story narratives, the processing system may be instructed to determine overlaps between words in the story narrative and the content words in the associated reference corpus, as well as compute at least one relevance feature associated with the story narrative using the determined overlaps. The processing system may then retrieve predetermined scores assigned to the story narratives by human raters and generate a narrative computer scoring model using the relevance features associated with the story narratives and the predetermined scores assigned to the story narratives. Thereafter, the narrative computer scoring model may be stored. The narrative computer scoring model is configured to output computer assessments of story narratives.

In another exemplary embodiment, the training of the narrative computer scoring model further comprises using collocation features associated with the story narratives. For example, for each of the retrieved story narratives, the processing system may be instructed to identify, in each sentence of the story narrative, groups of a predetermined number of adjacent words. The processing may be further instructed to determine a likely occurrence value for each of the groups of adjacent words. The likely occurrence value represents a likelihood of the associated adjacent words occurring in a corpus. Using the likely occurrence value, the processing system may be instructed to compute at least one collocation feature associated with the story narrative, which may be used in the training of the narrative computer scoring model.

In another exemplary embodiment, the training of the narrative computer scoring model further comprises using discourse features associated with the story narratives. For example, for each of the retrieved story narratives, the processing system may be instructed to identify transition cues within the story narrative using one or more lexicons. Using the identified transition cues, the processing system may be instructed to compute at least one discourse feature associated with the story narrative, which may be used in the training of the narrative computer scoring model.

In another exemplary embodiment, the training of the narrative computer scoring model further comprises using detailing features associated with the story narratives. For example, for each of the retrieved story narratives, the processing system may be instructed to identify syntactic categories of words in the story narrative using a part-of-speech tagger. The processing system may be further instructed to determine statistical measures of the words falling in one or more particular syntactic categories. Using the statistical measures, the processing system may compute at least one detailing feature associated with the story narrative using the statistical measures, which may be used in the training of the narrative computer scoring model.

In another exemplary embodiment, the training of the narrative computer scoring model further comprises using sentiment features associated with the story narratives. For example, for each of the retrieved story narratives, the processing system may be instructed to identify sentiment words and subjective words within the story narrative using one or more lexicons. Using the identified sentiment words and subjective words, the processing system may compute at least one sentiment feature associated with the story narrative using the identified sentiment words and subjective words. The sentiment features may be used in the training of the narrative computer scoring model.

DETAILED DESCRIPTION

Figure 1:
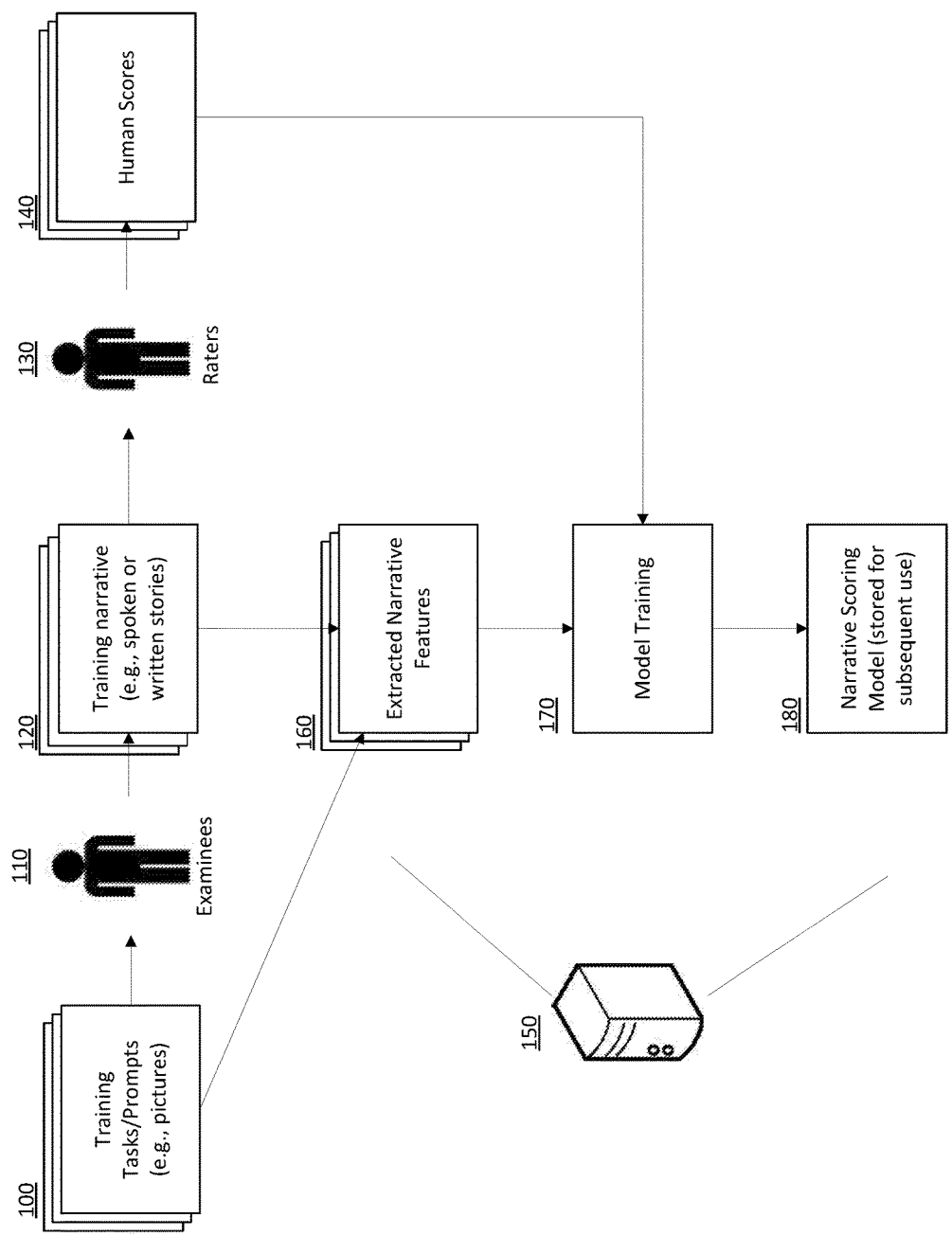
FIG. 1 is a block diagram depicting an exemplary computer-implemented system for generating a narrative computer scoring model for assessing story narratives.

FIG. 1 is a block diagram depicting an exemplary computer-implemented system for generating a narrative computer scoring model for assessing story narratives. In one embodiment, the narrative computer scoring model is generated using a collection of training assessment data. The training assessment data may include narratives 120, the training tasks or prompts 100 that were used to elicit the narratives 120, and predetermined scores 140 assigned to the narratives 120. The training tasks/prompts 100 may be in any format, including text, audio, video, and/or pictures. For example, a picture narration task 100 may ask an examinee 110 to provide a narrative 120 based on a series of pictures depicting a sequence of events. The narrative 120 in some embodiments may be a story, and may be in spoken or written form, e.g., text of multiple sentences or multiple paragraphs. If the narratives 120 are spoken, the system in some implementations may utilize automatic machine speech recognition technology to generate corresponding transcriptions of the narratives. The narratives 120 are then evaluated by trained raters 130, e.g., trained human raters, who are tasked with assigning each narrative 120 one or more corresponding scores 140 that reflect a perceived quality of the narrative 120. The narratives 120 and the associated training tasks/prompts 100 and scores 140 are then used to generate a narrative computer scoring model 180 for assessing narratives.

The narrative computer scoring model 180 may be generated using a computer processing system 150, which may include one or more computers. In one implementation, the computer processing system 150 may use supervised learning to generate a predictive model from labeled training data (e.g., training narratives that have been assigned/labeled with scores by human raters). The computer processing system 150 may be configured to process training narratives 120 and/or the associated tasks/prompts 100 and extract various features 160 (informative values derived from measured data) therefrom (details of which will be provided below). Each training narrative's 120 features 160 and assigned score 140 may serve as labeled training data points for training the model. Training 170 of a computer model 180, for example, may involve analyzing the labeled data points to determine the predictive significance/insignificance of each feature 160 in relation to the scores 140. In some implementations, training 170 of the computer model 180 may be accomplished using suitable machine learning techniques, including conventional techniques such as, e.g., Random Forest Classifiers, which is observed to produce one of the best results for the features described herein. As another example, regression analysis may also be used. To illustrate the model training process using regression analysis as an example, the model being trained may be a linear combination of weighted features. The extracted features 160 would constitute values for the independent variables of the model and the assigned scores 140 would constitute values for the dependent variable. Training 170 the model may involve, e.g., performing regression analysis on the training data points to determine optimal feature weights that would result in a model (i.e., in this example the linear combination of weight features) that "best fits" the training data. The resulting trained narrative computer scoring model 180 may then be stored and subsequently used by computer processors to automatically generate a score for a narrative based on features extracted therefrom without additional human intervention or judgment.

Figure 2:
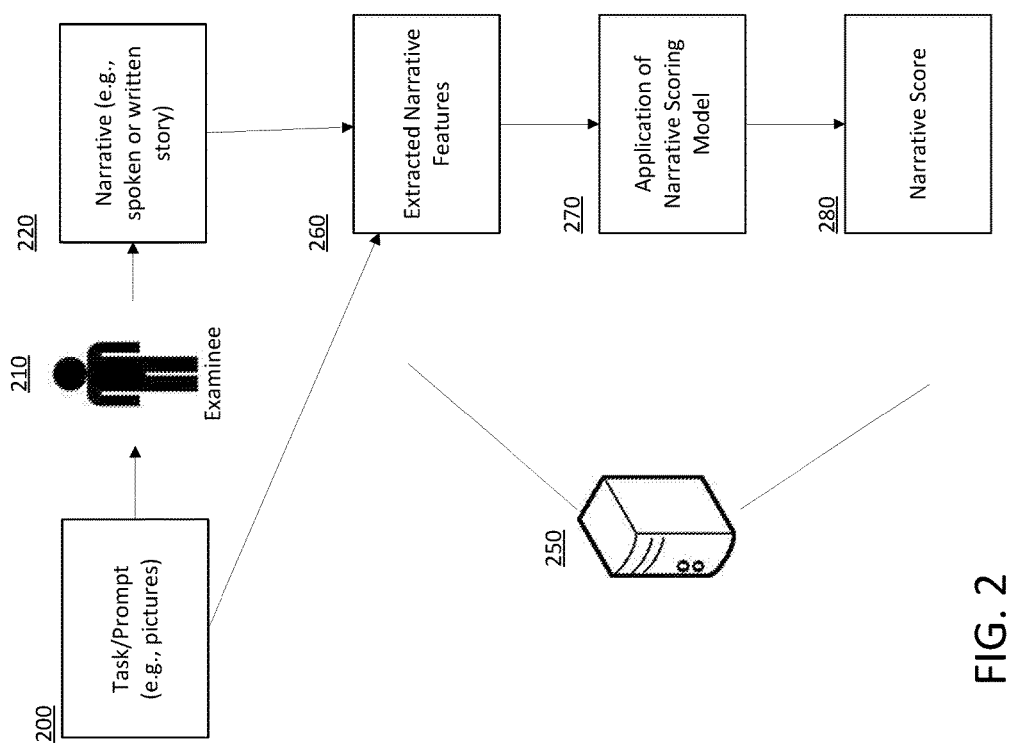
FIG. 2 is a block diagram depicting an exemplary computer-implemented system for assessing story narratives using a narrative computer scoring model.

FIG. 2 is a block diagram depicting an exemplary computer-implemented system for assessing story narratives using a narrative computer scoring model 180. As described above, the narrative computer scoring model 180 may be configured to analyze various predetermined features of a narrative and output a score. For example, the narrative 220 may be provided by an examinee in response to a task/prompt 200 (e.g., similar to the training test/prompt 100 described above). The computer processing system 250, which may include one or more computers, may extract various narrative features 260 by analyzing the narrative 220 and/or the associated task/prompt 200. The features and their extraction process are substantially the same as those used in the training process of the narrative computer scoring model 180 and will be described in more detail below. After feature extraction, the computer processing system 250 may apply the narrative computer scoring model 180 to the extracted narrative features 260 to output a narrative score 280. The narrative score 280 represents a computerized quality assessment of the narrative 220 determined without human intervention or judgment.

Figure 3:
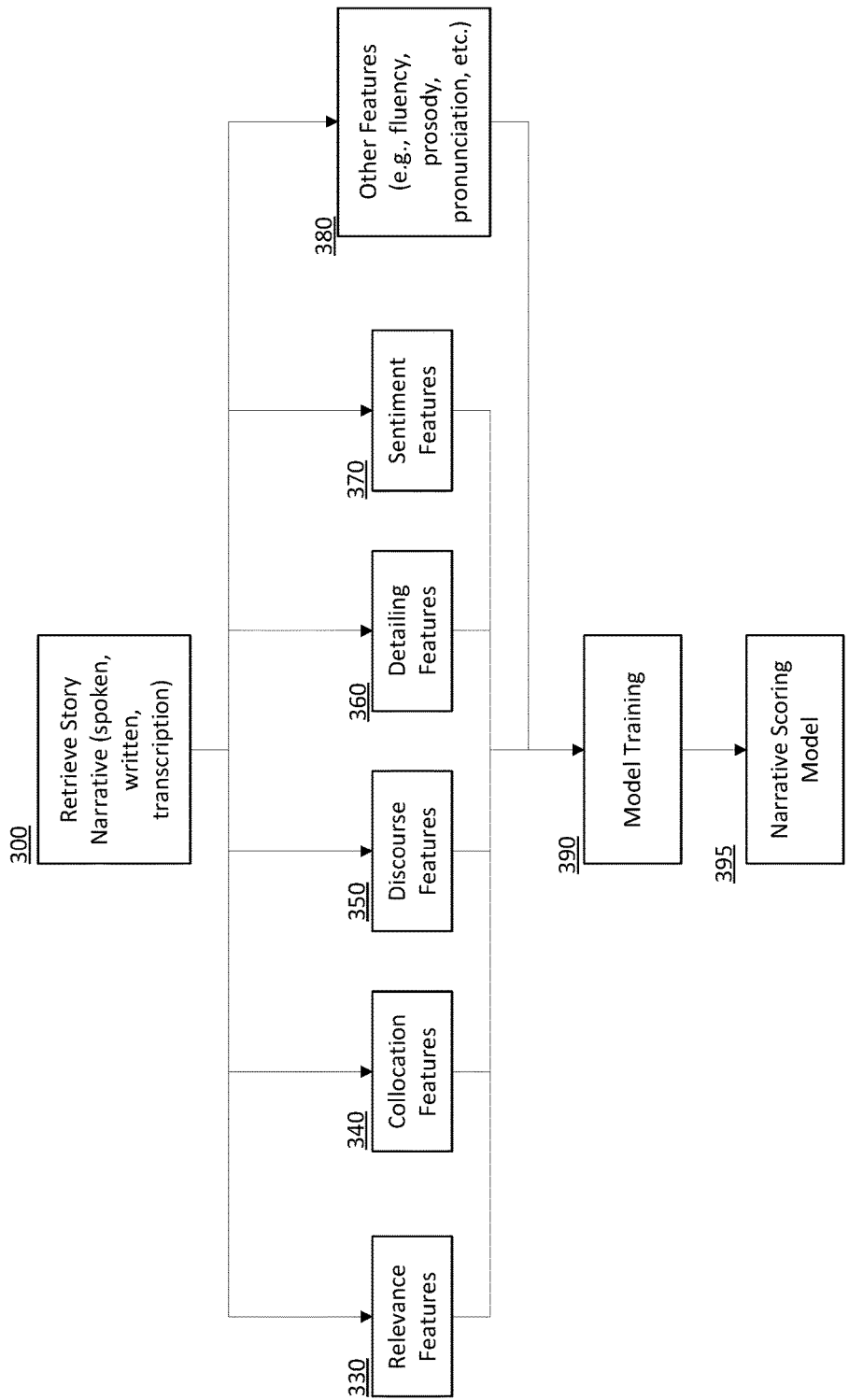
FIG. 3 is a flow diagram depicting an exemplary computer-implemented method for generating a narrative computer scoring model using a variety of features.

FIG. 3 is a flow diagram depicting an exemplary computer-implemented method for generating a narrative computer scoring model 180 using a variety of features. As described above, during model training (as well as usage of the model), various features may be extracted from the narrative 300 (e.g., a story uttered in response to a task/prompt). Exemplary features described herein enable computers to detect and analyze characteristics of narratives relevant to their perceived quality. For example, Relevance Features 330 include features that enable computers to determine whether the content of a story narrative relates to the associated task/prompt (e.g., whether the story is about the pictures in the prompt). Collocation Features 340 enable computers to detect proper word or phrase usage in the narrative. Discourse Features 350 enable computers to determine whether the narrative is adequately organized. Detailing features 360 enable computers to detect whether the narrative includes sufficient details for enhancing the story. Sentiment Features 370 enable computers to detect whether the story was sufficiently developed using emotions and character development, etc. These as well as other features 380, such as prosody, pronunciation, etc. that may be relevant to assessing narrative quality may be selectively used in training 390 and generating the narrative computer scoring model 395. Details of the Relevance Features 330, Collocation Features 340, Discourse Features 350, Detailing Features 360, and Sentiment Features 370 are provided below.

Relevance Features.

The Relevance Features are computer-recognizable narrative characteristics that may be indicative of content relevance with respect to the exam prompts. Conceptually, a good story narrative in the context of an exam would recite a story that is relevant to the exam prompt. In embodiments where the exam prompts are pictures, Relevance Features may be defined to identify overlaps between the content of the story narrative and the content of the pictures in the prompt. To facilitate this, each prompt may be associated with a reference corpus (not available to the test taker), which may contain a detailed description of each picture in the prompt and also an overall narrative that ties together the events in the pictures. For example, if the prompt is a series of pictures showing a dog, a running cat, and a tree, the reference corpus may include a description of each of those pictures (e.g., a black Labrador dog, a running white cat, and an orange leafy maple tree) and a narrative (e.g., a black dog chased a white cat up a maple tree). Several different types of descriptions and narratives may be included in the reference corpus. The reference corpus may be automatically generated by computers using image recognition techniques, known in the art, and/or by human annotators. Using the reference corpus, relevance of the story narrative to the contents of the prompts may be automatically determined without human intervention or human judgment.

Figure 4:
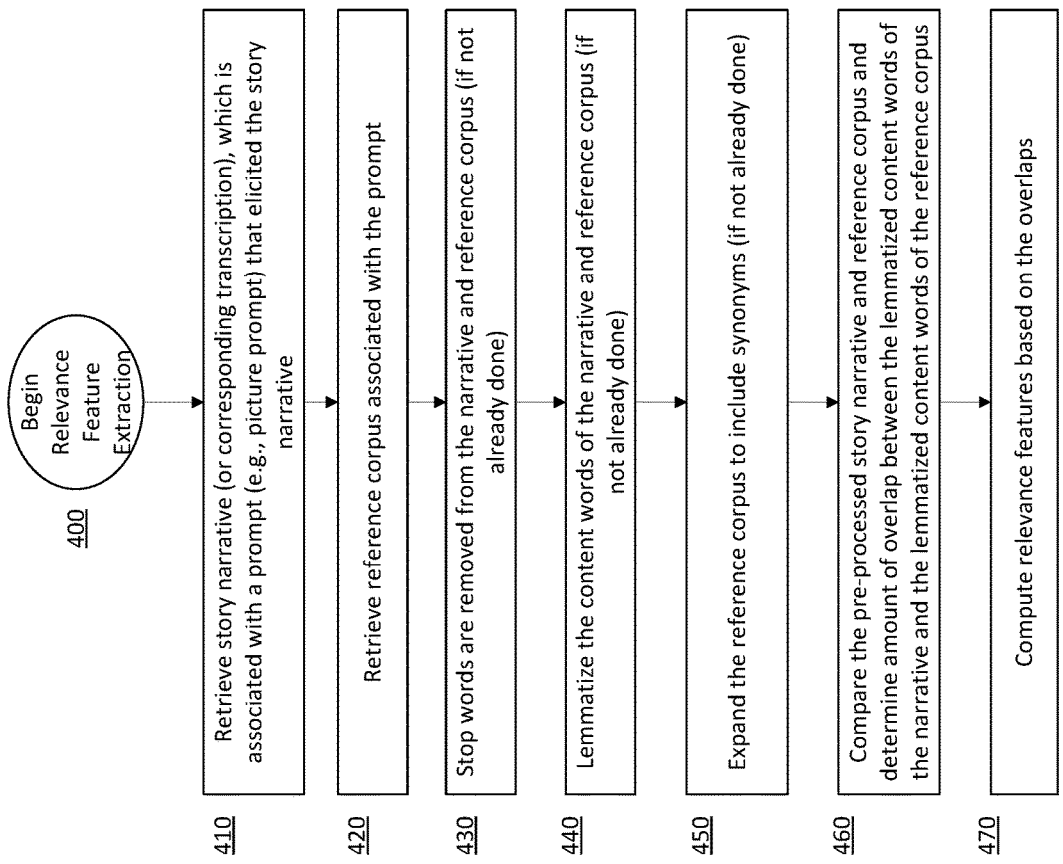
FIG. 4 is a flow diagram depicting an exemplary computer-implemented method for extracting relevance features from story narratives.

FIG. 4 is a flow diagram depicting an exemplary computer-implemented method for extracting Relevance Features from story narratives. Computer encoded instructions, which may be implemented using any suitable computer programming language (e.g., Java, C++, C, Python, PEARL, Assembly, etc.), may be used to program a computer processing system to iteratively extract Relevance Features from each story narrative of interest (e.g., a story narrative used for model training or a story narrative under evaluation), the process for which begins at 400. The process 400 may be repeated for each story narrative iteratively or the story narratives may be processed 400 in parallel using multiple processors.

At 410, one of the story narratives may be retrieved by the computer processing system from storage (e.g., local hard drive, memory, cache, a remote source, etc.). The story narrative may be associated with a task/prompt that elicited the story narrative, e.g., an instruction to generate a narrative based on one or more images. The story narrative, for example, may be in textual format (e.g., it was originally written by the examinee or automatically transcribed from audio using automatic machine speech recognition technology). At 420, a reference corpus associated with the prompt may be retrieved from storage. As described above, the reference corpus may include written descriptions and/or narratives relating to contents of the prompt. The reference corpus may be used as the basis for comparing the content of the prompt to that of the story narrative, as will be described with respect to 460.

In order to improve performance and/or the accuracy of comparing content of the story narrative and the reference corpus, the story narrative and reference corpus may undergo several pre-processing steps before comparisons are made. For example, at 430, stop words may be removed from the story narrative and the reference corpus using, e.g., a predetermined stop words lexicon. Stop words, which are well known in natural language processing, generally refer to a list of commonly occurring words in language (e.g., articles such as "the," and auxiliary words such as "is"). Since stop words are common and have little relevance to content, their presence in the narrative and reference corpus may skew the comparisons and therefore may warrant removal. Another exemplary pre-processing step is lemmatization of the content words in the story narrative and the reference corpus, depicted at 440. This allows the computer to better focus on content and improve efficiency. Another pre-processing step involves expanding the content words in the reference corpus by adding their synonyms and other related words, depicted at 450. This may be desirable because examinees may use synonyms and related words to describe substantively the same content. Synonyms may be identified using one or more thesauruses, such as, e.g., Lin's thesaurus, WordNet synonyms, WordNet hypernyms, and WordNet hyponyms. These pre-processing steps, as well as others, may be selectively performed and may occur in different orders or substantially simultaneously. In addition, these pre-processing steps may be performed before the retrieval of the story narrative at 410 and/or reference corpus at 420. In other words, the retrieved narrative and reference corpus may have already been pre-processed.

At 460, the computer processing system may detect content relevance by comparing the story narrative and the reference corpus (which may have undergone pre-processing, as described above) to determining overlaps in content words. At 470, one or more Relevance Features 470 may be computed based on the amount of overlaps, which may be represented using, e.g., a numeric count of the number of overlapping content words, the count normalized by the length of the narrative, and other statistical measures. Moreover, different Relevance Features may be computed based on the underlying data used. For example, one feature may measure the overlap between the lemmatized story narrative and a lemmatized reference corpus that has not been expanded with synonyms. Other features may be similarly computed for each type of synonym expansion undergone by the reference corpus. For example, another feature may be computed for reference corpora expanded using Lin's thesaurus; another feature for reference corpora expanded using WordNet Synonyms; another feature for reference corpora expanded using WordNet Hypernyms; another feature for reference corpora expanded using WordNet Hyponyms; another feature for reference corpora expanded using all of the above word lists; etc. As described above, one or more Relevance Features may be used along with other feature types to train a narrative computer scoring model and be used to automatically assess narratives.

Collocation Features.

Collocation Features are computer-recognizable collocation characteristics that may signify the quality of language use. Conceptually, it is observed that inexperienced use of language is often characterized by inappropriate combinations of words, indicating the writer's lack of knowledge of collocations. For example, if the story narrative includes the phrase, "the boys is" (i.e., improper subject-verb agreement), the computer may be enabled to detect such misuse by checking whether "boys is" commonly appears in a large reference corpus. A determination that the occurrence is uncommon may signify poor language use. Thus, one method for enabling a computer to detect poor language use is by instructing the computer to determine the likelihood of collocating words in the story narrative occurring in typical language use.

Figure 5:
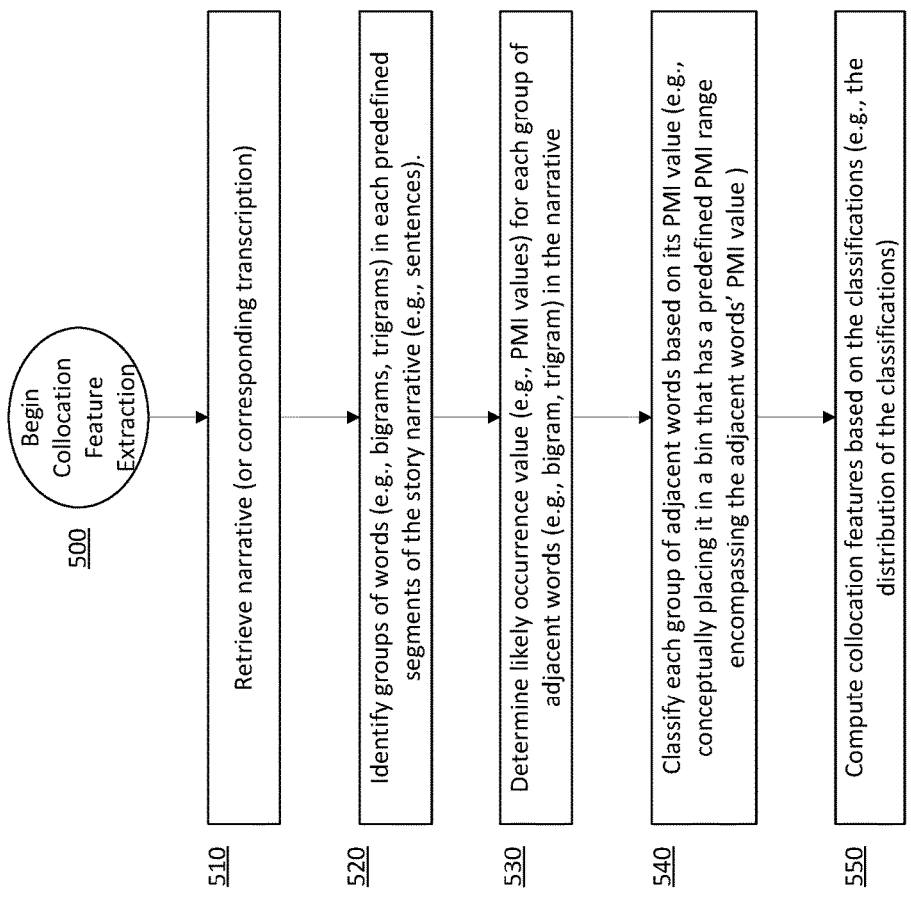
FIG. 5 is a flow diagram depicting an exemplary computer-implemented method for extracting collocation features from story narratives.

FIG. 5 is a flow diagram depicting an exemplary computer-implemented method for extracting collocation features from story narratives, the steps of which may be executed by a computer processing system programmed with computer program instructions. At 500, a computer processing system begins the process of iteratively extracting Collocation Features for each story narrative of interest (e.g., a story narrative used for model training or a story narrative under evaluation). The process 500 may be repeated for each story narrative iteratively or the story narratives may be processed 500 in parallel using multiple processors.

At 510, one of the story narratives is retrieved by the computer processing system from storage, similar to the descriptions related to FIG. 4 at 410. At 520, groups of a predetermined number of adjacent words (e.g., bigrams, trigrams, etc.) are identified in each predefined segment (e.g., sentences, paragraphs) of the story narrative. For example, for a sentence reciting, "A dog chased a cat," the groups of word pairs (bigrams) may be: [a dog], [dog chased], [chased a], and [a cat]. At 530, a likely occurrence value for each word group is measured. In one example, the measurement is based on the Pointwise Mutual Information (PMI) of word groups in a large corpus (e.g., the Google 1T web corpus). Conceptually, commonality of collocation for a given word group in well-formed text is represented by high PMI values. Conversely, negative PMI values indicate that the given word group is less likely than chance to occur together in the corpus, thus indicating poor or awkward language use. In some implementations, the PMI values may be determined using a PMI look-up database.

At 540, the computer processing system determines a statistical distribution of the word groups based on, e.g., their PMI values. In one embodiment, the distribution is determined by conceptually assigning each word group, based on its PMI value, to one of a plurality of bins with predetermined PMI ranges. For example, eight bins may be defined for bigrams and another eight bins may be defined for trigrams. Each set of eight bins may respectively represent the following ranges of PMI value (denoted by p): $p > 20$; $10 < p \leq 20$; $1 < p \leq 10$; $0 < p \leq 1$; $-1 < p \leq 0$; $-10 < p \leq -1$; $-20 < p \leq -10$; $p \leq -20$.

At 550, Collocation Features may be computed based on the distribution of the word groups. For example, one feature may be based on the counts of word groups falling into each bin, and another feature may be based on percentages of word groups falling into each bin. In addition, other features representing the best and the worst collocations as well as the overall general quality of collocations may be generated. In one implementation, the best collocation may be represented by the maximum PMI value assigned to the word groups in the narrative, the worst collocation may be represented by the minimum PMI value, and the overall collocation may be represented by the median or mean PMI value. As described above, one or more Collocation Features may be used along with other feature types to train a narrative computer scoring model and be used to automatically assess narratives.

Discourse Features.

The Discourse Features are computer-recognizable characteristics that may be evidence of coherence, which may signify good story telling since stories are often characterized by events that are related and/or ordered temporally or causally. Cohesion or organization in narrative is often established in language using proper transition cues. Since coherent narratives are more likely to have transition cues than non-coherent narratives, the Discourse Features are designed to measure the level of transition cues present in narratives.

Figure 6:
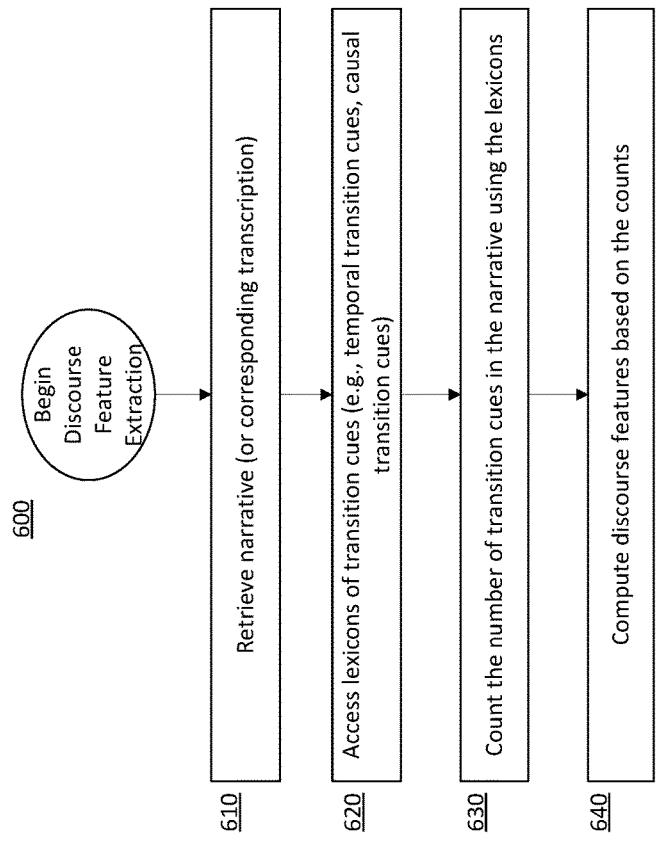
FIG. 6 is a flow diagram depicting an exemplary computer-implemented method for extracting discourse features from story narratives.

FIG. 6 is a flow diagram depicting an exemplary computer-implemented method for extracting Discourse Features from story narratives, steps of which may be executed by a computer processing system programmed with computer program instructions. At 600, a computer processing system begins the process of iteratively extracting Discourse Features for each story narrative of interest (e.g., a story narrative used for model training or a story narrative under evaluation). The process 600 may be repeated for each story narrative iteratively or the story narratives may be processed 600 in parallel using multiple processors.

At 610, one of the story narratives is retrieved by the computer processing system from storage, similar to the descriptions related to FIG. 4 at 410. At 620, the processing system may access lexicons of transition cues to detect transitions. In one embodiment, the lexicons may further include sense information relating to each transition cue. Sense information, for example, may be an indication that the associated transition cue is of a temporal nature (e.g., words such as after, before, then, finally, etc.) or causal nature (e.g., words such as: if, then, consequently, because, etc.). The computer processing system may detect such words without human intervention or judgment. At 630, the transition cues in the story narrative may be identified by comparing the words in the narrative with the lexicons. In some embodiments, the number of total transition cues and cues of different senses (e.g., causal transition cues and temporal transition cues) may be counted and the occurrence frequencies may be used to generate probability distributions. At 640, the collected statistical information (e.g., counts and probability distributions) may be used to generate one or more Discourse Features for the story narrative. Exemplary Discourse Features include: the number of cues found in the narrative; the number of cues found in the narrative divided by the number of words in the narrative; the number of cues belonging to the temporal category; the number of cues belonging to the causal category, the sum of the probabilities of belonging to the temporal category for each cue found in the narrative; the sum of the probabilities of belonging to the causal category for each cue found in the narrative. As described above, one or more Discourse Features may be used along with other feature types to train a narrative computer scoring model and be used to automatically assess narratives.

Detailing Features.

One technique for effective story telling is providing vivid descriptions to add depth to events and characters. For example, instead of saying, "In the afternoon a boy and a man went to the library," one could make the story more interesting by assigning names to the character and places: "One day John went to the Central Public Library because he wanted to do some research for his science project. An old man was walking behind him; his name was Peter." It is observed that certain syntactic categories, such as adjectives and adverbs, are often used to provide detail. In addition, it is observed that proper nouns, such as names of characters and places, may also be added to enhance a story's details. Thus, in one embodiment, the Detailing Features define computer-recognizable characteristics—such as the existence of adjectives, adverbs, and proper nouns—that may signify detail enhancement. The computer processing system may identify such features as described below with reference to FIG. 7.

Figure 7:
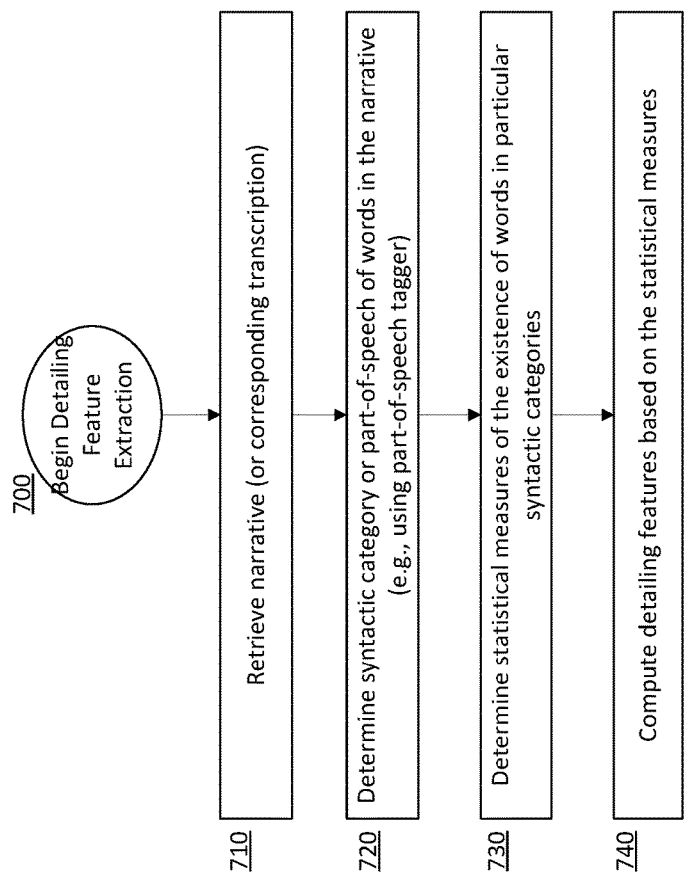
FIG. 7 is a flow diagram depicting an exemplary computer-implemented method for extracting detailing features from story narratives.

FIG. 7 is a flow diagram depicting an exemplary computer-implemented method for extracting Detailing Features from story narratives. A computer processing system may iteratively extract Detailing Features for each story narrative of interest (e.g., a story narrative used for model training or a story narrative under evaluation), a process for which begins at 700. The process 700 may be repeated for each story narrative iteratively or the story narratives may be processed 700 in parallel using multiple processors.

At 710, one of the story narratives may be retrieved by the computer processing system from storage, similar to the descriptions related to FIG. 4 at 410. At 720, syntactic categories, i.e., parts-of-speech of words in the story narrative may be identified. In some examples, this may be automatically accomplished using a machine part-of-speech tagger. At 730, statistical measures of the existence of words in particular syntactic categories, such as proper nouns, adverbs, and adjectives, may be determined. Statistical measures may include, e.g., counts of the number of words belonging to particular syntactic categories, percentages of such words, distribution of such words, etc. At 740, the collected statistical measures may be used to compute one or more Detailing Features for the story narrative. Exemplary Detailing Features include: a binary value indicating whether the narrative contains any proper nouns; the number of proper nouns in the narrative; a binary value indicating whether the narrative contains any adjectives; the number of adjectives in the narrative; a binary value indicating whether the narrative contains any adverbs; the number of adverbs in the narrative; etc. Separate features for counts and presence of the same phenomenon may be used in order to balance the trade-off between sparsity and informativeness. While count features may be more informative, they may be sparse (especially for higher counts). As described above, one or more Detailing Features may be used along with other feature types to train a narrative computer scoring model and be used to automatically assess narratives.

Sentiment Features.

One technique used to develop a story is by revealing a character's private states, emotions, and feelings. This may involve the use of words that convey sentiment and subjectivity. In one embodiment, examples disclosed herein may involve the use of the Sentiment Features, which are computer-recognizable characteristics relating to the level of sentiment and subjectivity in the narrative.

Figure 8:
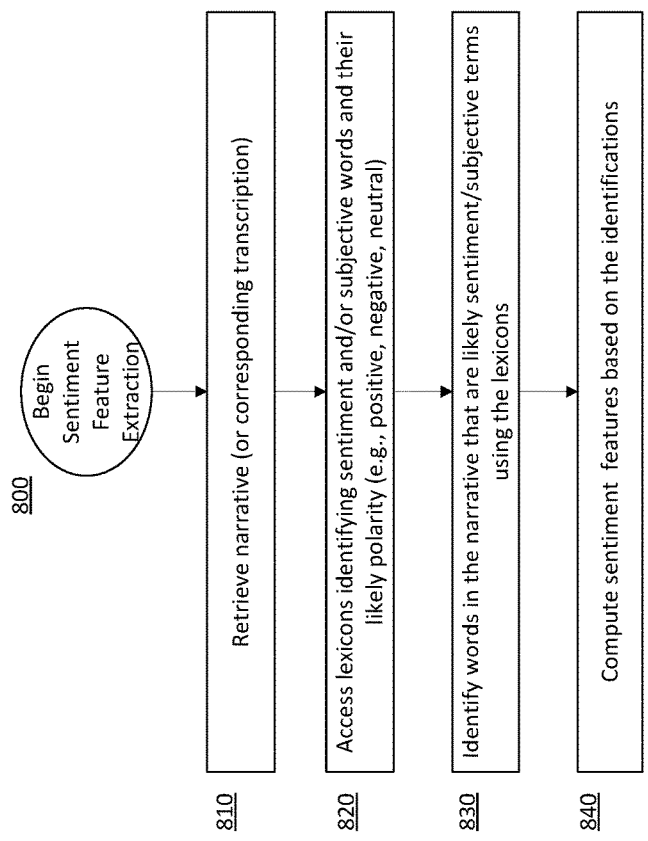
FIG. 8 is a flow diagram depicting an exemplary computer-implemented method for extracting sentiment features from story narratives.

FIG. 8 is a flow diagram depicting an exemplary computer-implemented method for extracting Sentiment Features from story narratives. A computer processing system may iteratively extract Sentiment Features for each story narrative of interest (e.g., a story narrative used for model training or a story narrative under evaluation), a process for which begins at 800. The process 800 may be repeated for each story narrative iteratively or the story narratives may be processed 800 in parallel using multiple processors.

At 810, one of the story narratives is retrieved by the computer processing system from storage, similar to the descriptions related to FIG. 4 at 410. At 820, the processing system may access lexicons for annotating sentiment and subjective words in the story narrative. In some examples, the lexicons used may further identify whether each sentiment/subjective word in the lexicons has a positive polarity (e.g., "happy"), negative polarity (e.g., "sad"), or is neutral (e.g., "feel"). In some examples, the assigned polarity may be in the form of a polarity probability profile (e.g., each word may have an assigned probability of being positive, a probability of being negative, and a probability of being neutral). If a lexicon with predetermined polarity probability profiles is used, in some embodiments a determination of polarity may be based on the level of probabilities (e.g., if the sum of the probability for a word exceeds a certain threshold, such as 0.65, then the word is deemed to be polar; otherwise, the word is deemed to be neutral). At 830, sentiment and subjective terms in the narrative may be identified by comparing the words in the narrative to those in the lexicons. At 840, the identified words and the corresponding sentiment/subjective information obtained from the lexicons may be used to compute one or more Sentiment Features for the story narrative. In instances where polarity information is available, some features may be polarity specific (e.g., a feature may capture a proportion of words in the narrative that are either positive or negative). Certain features may also capture the existence of neutral words if such words indicate speech events and private states (e.g., view, assess, believe, cogitate, contemplate, feel, glean, think, etc.). Exemplary Sentiment Features include: a binary value indicting whether the narrative contains any polar sentiment words; the number of polar sentiment words found in the narrative; a binary value indicating whether the narrative contains any polar subjective words; the number of polar subjective words in the narrative; a binary value indicating whether the narrative contains any neutral subjective words; the number of neutral subjective words in the narrative; etc. As described above, one or more Sentiment Features may be used along with other feature types to train a narrative computer scoring model and be used to automatically assess narratives.

Figure 9A:
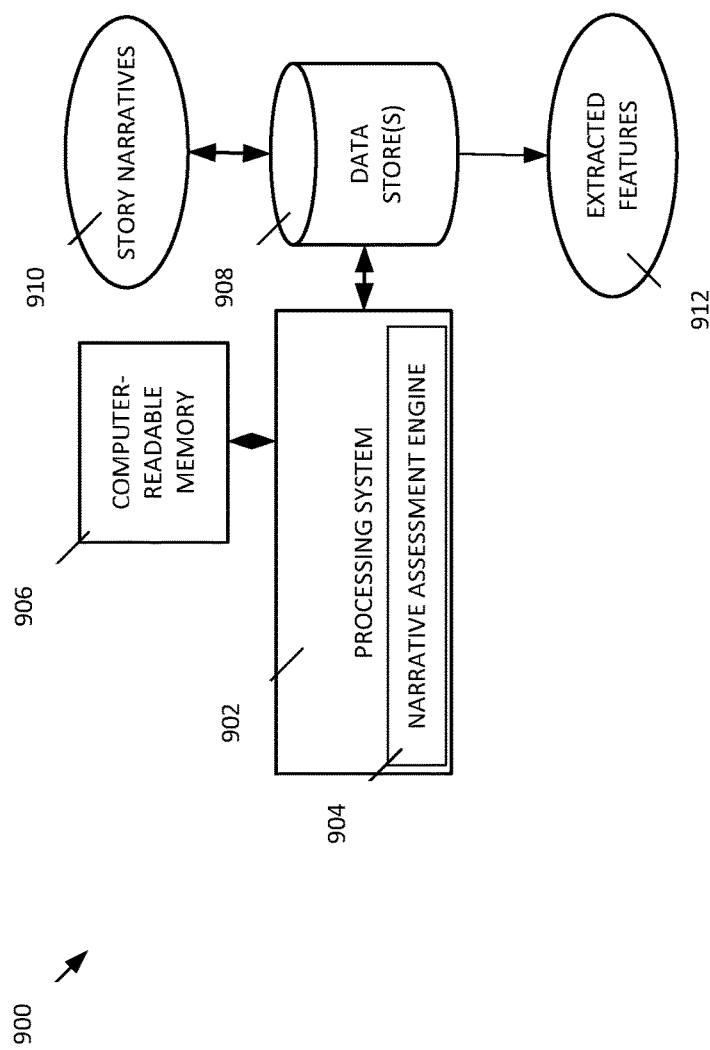
FIGS. 9A, 9B, and 9C depict example systems for use in implementing an exemplary system for assessing story narratives.
Figure 9B:
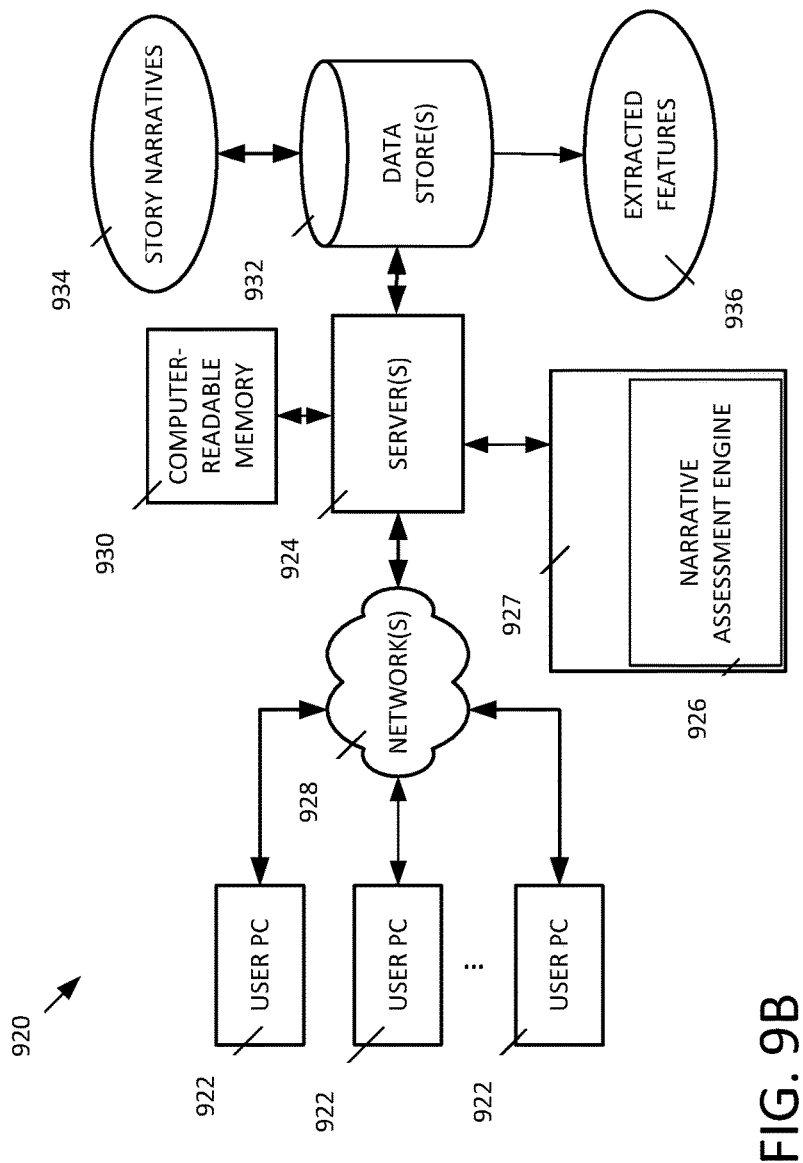
Figure 9C:
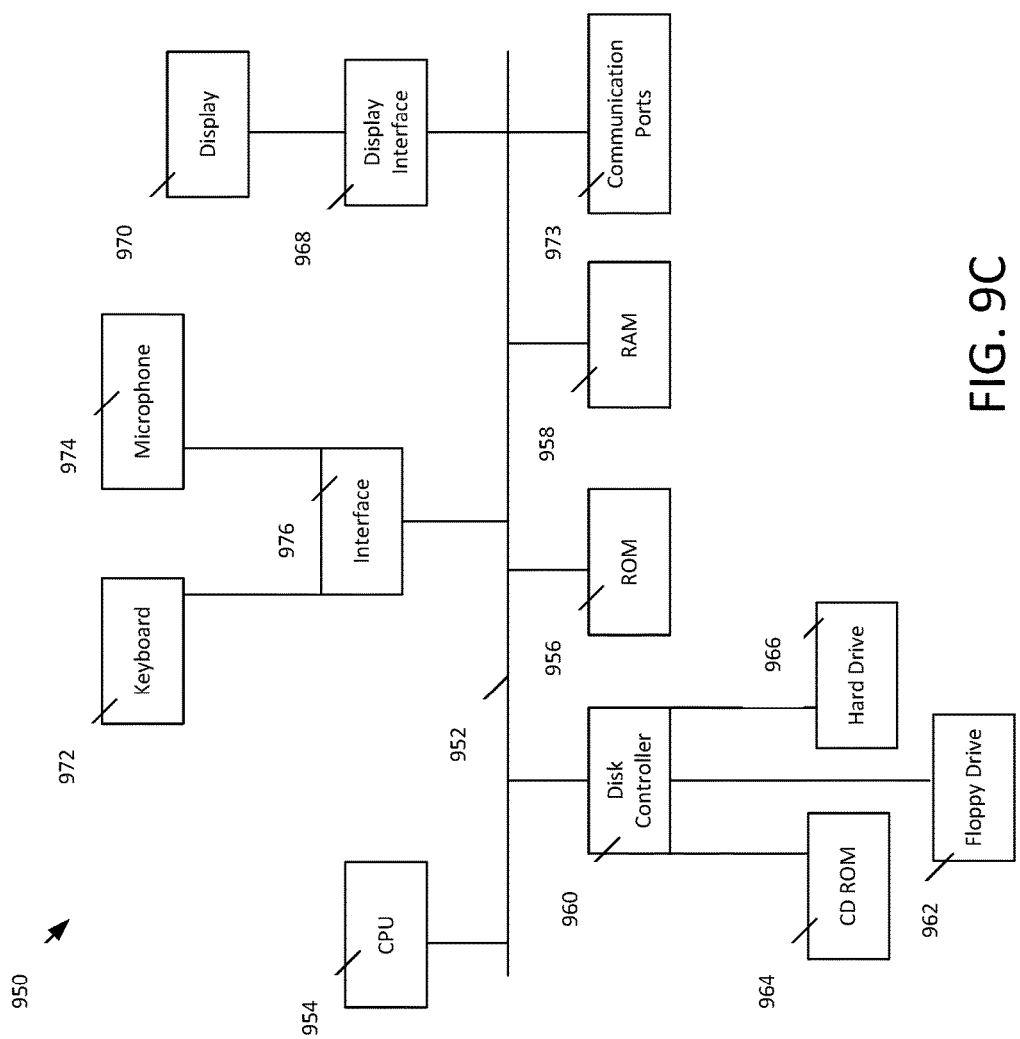

Examples have been used to describe the invention herein, and the scope of the invention may include other examples. FIGS. 9A, 9B, and 9C depict example systems for use in assessing story narratives. For example, FIG. 9A depicts an exemplary system 900 that includes a standalone computer architecture where a processing system 902 (e.g., one or more computer processors located in a given computer or in multiple computers that may be separate and distinct from one another) includes a narrative assessment engine 904 or narrative assessment model generation engine being executed on it. The processing system 902 has access to a computer-readable memory 906 in addition to one or more data stores 908. The one or more data stores 908 may include story narratives 910 as well as extracted features 912.

FIG. 9B depicts a system 920 that includes a client server architecture. One or more user PCs 922 access one or more servers 924 running a narrative assessment engine or narrative assessment model generation engine 926 on a processing system 927 via one or more networks 928. The one or more servers 924 may access a computer readable memory 930 as well as one or more data stores 932. The one or more data stores 932 may contain story narratives 934 as well as extracted features 936.

FIG. 9C shows a block diagram of exemplary hardware for a standalone computer architecture 950, such as the architecture depicted in FIG. 9A that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 956 and random access memory (RAM) 958, may be in communication with the processing system 954 and may contain one or more programming instructions for performing the method of implementing a narrative assessment engine or a narrative assessment model generation engine. Optionally, program instructions may be stored on a non-transitory computer readable storage medium such as a magnetic disk, optical disk, recordable memory device, flash memory, or other physical storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 972.

In addition to the standard computer-type components, the hardware may also include data input devices, such as a keyboard 973, or other input device 974, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for generating a narrative computer scoring model for assessing story narratives, comprising:
    retrieving, by a processing system, story narratives, wherein each story narrative is associated with a prompt that elicited the story narrative;
    retrieving, by the processing system, reference corpora associated with the story narratives, wherein each story narrative's associated reference corpus includes content words relating to the associated prompt;
    for each of the retrieved story narratives:
        determining, by the processing system, overlaps between words in the story narrative and the content words in the associated reference corpus; and
        computing, by the processing system, at least one relevance feature associated with the story narrative using the determined overlaps;
    retrieving, by the processing system, predetermined scores assigned to the story narratives by human raters;
    generating, by the processing system, a narrative computer scoring model using the relevance features associated with the story narratives and the predetermined scores assigned to the story narratives; and
    storing, by the processing system, the narrative computer scoring model;
    wherein the narrative computer scoring model is configured to output computer assessments of story narratives.

2. The method of claim 1,
    wherein the story narratives are transcriptions of audio story narratives; and
    wherein the prompts are pictures.

3. The method of claim 1, further comprising:
    removing stop words from the story narratives and the reference corpora; and
    lemmatizing the story narratives and the reference corpora.

4. The method of claim 1, further comprising:
    identifying synonyms for the content words in the reference corpora; and
    expanding the reference corpora by including the identified synonyms.

5. The method of claim 1, further comprising:
    for each of the retrieved story narratives:
        identifying, in each sentence of the story narrative, groups of a predetermined number of adjacent words;

determining a likely occurrence value for each of the groups of adjacent words, wherein the likely occurrence value represents a likelihood of the associated adjacent words occurring in a corpus; and computing at least one collocation feature associated with the story narrative using the likely occurrence values;

wherein the training of the narrative computer scoring model further comprises using the collocation features associated with the story narratives.

6. The method of claim 5, further comprising:
for each of the retrieved story narratives:
determining a statistical distribution of the groups based on the associated likely occurrence values;
wherein the computing of the at least one collocation feature uses the statistical distribution.

7. The method of claim 6, wherein determining the statistical distribution includes conceptually assigning each of the groups to one of a plurality of bins based on the group's likely occurrence value.

8. The method of claim 5, wherein the likely occurrence value is determined using pointwise mutual information (PMI).

9. The method of claim 1, further comprising:
for each of the retrieved story narratives:
identifying transition cues within the story narrative using one or more lexicons; and
computing at least one discourse feature associated with the story narrative using the identified transition cues;
wherein the training of the narrative computer scoring model further comprises using the discourse features associated with the story narratives.

10. The method of claim 9,
wherein identifying the transition cues includes identifying temporal transition cues and identifying causal transition cues; and
wherein the computing of the at least one discourse feature includes using the identified temporal transition cues and the causal transition cues.

11. The method of claim 1, further comprising:
for each of the retrieved story narratives:
identifying syntactic categories of words in the story narrative using a part-of-speech tagger;
determining statistical measures of the words falling in one or more particular syntactic categories; and
computing at least one detailing feature associated with the story narrative using the statistical measures;
wherein the training of the narrative computer scoring model further comprises using the detailing features associated with the story narratives.

12. The method of claim 11, wherein the one or more particular syntactic categories are selected from the group consisting of proper nouns, adjectives, and adverbs.

13. The method of claim 1, further comprising:
for each of the retrieved story narratives:
identifying sentiment words and subjective words within the story narrative using one or more lexicons; and
computing at least one sentiment feature associated with the story narrative using the identified sentiment words and subjective words;
wherein the training of the narrative computer scoring model further comprises using the sentiment features associated with the story narratives.

14. The method of claim 13, wherein the sentiment words and subjective words used for computing the at least one sentiment feature have either positive or negative polarity.

15. The method of claim 13, wherein the sentiment words and subjective words used for computing the at least one sentiment feature have neutral polarity.

16. A computer-implemented system for generating a narrative computer scoring model for assessing story narratives, comprising:
one or more data processors; and
a memory comprising instructions which when executed cause the one or more data processors to execute steps comprising:
retrieving story narratives, wherein each story narrative is associated with a prompt that elicited the story narrative;
retrieving reference corpora associated with the story narratives, wherein each story narrative's associated reference corpus includes content words relating to the associated prompt;
for each of the retrieved story narratives:
determining overlaps between words in the story narrative and the content words in the associated reference corpus; and
computing at least one relevance feature associated with the story narrative using the determined overlaps;
retrieving predetermined scores assigned to the story narratives by human raters;
generating a narrative computer scoring model using the relevance features associated with the story narratives and the predetermined scores assigned to the story narratives; and
storing the narrative computer scoring model;
wherein the narrative computer scoring model is configured to output computer assessments of story narratives.

17. The system of claim 16, wherein the memory comprises instructions for causing the one or more data processors to execute further steps comprising:
for each of the retrieved story narratives:
identifying, in each sentence of the story narrative, groups of a predetermined number of adjacent words;
determining a likely occurrence value for each of the groups of adjacent words, wherein the likely occurrence value represents a likelihood of the associated adjacent words occurring in a corpus; and
computing at least one collocation feature associated with the story narrative using the likely occurrence values;
wherein the training of the narrative computer scoring model further comprises using the collocation features associated with the story narratives.

18. The system of claim 16, wherein the memory comprises instructions for causing the one or more data processors to execute further steps comprising:
for each of the retrieved story narratives:
identifying transition cues within the story narrative using one or more lexicons; and
computing at least one discourse feature associated with the story narrative using the identified transition cues;
wherein the training of the narrative computer scoring model further comprises using the discourse features associated with the story narratives.

19. The system of claim 16, wherein the memory comprises instructions for causing the one or more data processors to execute further steps comprising:
for each of the retrieved story narratives:
identifying syntactic categories of words in the story narrative using a part-of-speech tagger;
determining statistical measures of the words falling in one or more particular syntactic categories; and
computing at least one detailing feature associated with the story narrative using the statistical measures;
wherein the training of the narrative computer scoring model further comprises using the detailing features associated with the story narratives.

20. The system of claim 16, wherein the memory comprises instructions for causing the one or more data processors to execute further steps comprising:
for each of the retrieved story narratives:
identifying sentiment words and subjective words within the story narrative using one or more lexicons; and
computing at least one sentiment feature associated with the story narrative using the identified sentiment words and subjective words;
wherein the training of the narrative computer scoring model further comprises using the sentiment features associated with the story narratives.

21. A non-transitory computer-readable medium encoded with instructions for generating a narrative computer scoring model for assessing story narratives, the instructions being configured to cause a computer processing system to execute steps comprising:
retrieving story narratives, wherein each story narrative is associated with a prompt that elicited the story narrative;
retrieving reference corpora associated with the story narratives, wherein each story narrative's associated reference corpus includes content words relating to the associated prompt;
for each of the retrieved story narratives:
determining overlaps between words in the story narrative and the content words in the associated reference corpus; and
computing at least one relevance feature associated with the story narrative using the determined overlaps;
retrieving predetermined scores assigned to the story narratives by human raters;
generating a narrative computer scoring model using the relevance features associated with the story narratives and the predetermined scores assigned to the story narratives; and
storing the narrative computer scoring model;
wherein the narrative computer scoring model is configured to output computer assessments of story narratives.

22. The non-transitory computer-readable medium of claim 21, wherein the instructions being configured to cause the computer processing system to execute further steps comprising:
for each of the retrieved story narratives:
identifying, in each sentence of the story narrative, groups of a predetermined number of adjacent words;
determining a likely occurrence value for each of the groups of adjacent words, wherein the likely occurrence value represents a likelihood of the associated adjacent words occurring in a corpus; and
computing at least one collocation feature associated with the story narrative using the likely occurrence values;
wherein the training of the narrative computer scoring model further comprises using the collocation features associated with the story narratives.

23. The non-transitory computer-readable medium of claim 21, wherein the instructions being configured to cause the computer processing system to execute further steps comprising:
for each of the retrieved story narratives:
identifying transition cues within the story narrative using one or more lexicons; and
computing at least one discourse feature associated with the story narrative using the identified transition cues;
wherein the training of the narrative computer scoring model further comprises using the discourse features associated with the story narratives.

24. The non-transitory computer-readable medium of claim 21, wherein the instructions being configured to cause the computer processing system to execute further steps comprising:
for each of the retrieved story narratives:
identifying syntactic categories of words in the story narrative using a part-of-speech tagger;
determining statistical measures of the words falling in one or more particular syntactic categories; and
computing at least one detailing feature associated with the story narrative using the statistical measures;
wherein the training of the narrative computer scoring model further comprises using the detailing features associated with the story narratives.

25. The non-transitory computer-readable medium of claim 21, wherein the instructions being configured to cause the computer processing system to execute further steps comprising:
for each of the retrieved story narratives:
identifying sentiment words and subjective words within the story narrative using one or more lexicons; and
computing at least one sentiment feature associated with the story narrative using the identified sentiment words and subjective words;
wherein the training of the narrative computer scoring model further comprises using the sentiment features associated with the story narratives.

* * * * *